(12) United States Patent
Rae et al.

(10) Patent No.: US 6,674,599 B1
(45) Date of Patent: Jan. 6, 2004

(54) DATA STORAGE METHOD, APPARATUS AND MEDIUM

(75) Inventors: Simon Rae, Bristol (GB); Mark Robert Watkins, Bristol (GB); Paul Frederick Bartlett, Boise, ID (US)

(73) Assignee: Hewlett-Packard Development Company, L.C., Houston, TX (US)

( * ) Notice: Subject to any disclaimer, the term of this patent is extended or adjusted under 35 U.S.C. 154(b) by 0 days.

(21) Appl. No.: 09/265,356

(22) Filed: Mar. 10, 1999

(30) Foreign Application Priority Data

Mar. 13, 1998 (GB) .............................................. 9805325

(51) Int. Cl.⁷ .............................. G11B 15/18; G11B 5/09
(52) U.S. Cl. ........................... 360/72.1; 360/53; 360/69
(58) Field of Search ........................ 360/69, 132, 72.1, 360/72.2, 27, 53, 74.1, 74.4

(56) References Cited

U.S. PATENT DOCUMENTS

| | | | |
|---|---|---|---|
| 4,338,644 A | | 7/1982 | Staar ............................ 360/132 |
| 4,752,834 A | | 6/1988 | Koombes ..................... 358/335 |
| 5,493,455 A | * | 2/1996 | Miyoshi et al. ................. 360/60 |
| 5,525,902 A | * | 6/1996 | Nakajima et al. ............. 324/212 |
| 5,852,534 A | * | 12/1998 | Ozue et al. ...................... 360/69 |
| 5,943,468 A | * | 8/1999 | Takayana ...................... 386/113 |
| 6,124,999 A | * | 9/2000 | Yamamoto ...................... 360/69 |
| 6,182,191 B1 | * | 1/2001 | Fukuzono et al. ............. 711/111 |
| 6,327,417 B1 | * | 12/2001 | Hanai et al. ................... 386/46 |

FOREIGN PATENT DOCUMENTS

| | | |
|---|---|---|
| EP | 0580434 A1 | 1/1994 |
| EP | 0605886 A2 | 7/1994 |
| EP | 0 630 022 A2 | 12/1994 |
| EP | 0640972 A2 | 3/1995 |
| EP | 0 646 914 A2 | 4/1995 |
| EP | 0646914 A2 | 4/1995 |
| JP | 04286791 | 10/1992 |
| WO | 89/10615 A1 | 11/1989 |

* cited by examiner

Primary Examiner—Andrew L. Sniezek

(57) ABSTRACT

A tape is associated with a semiconductor memory storing the end position of the last data of a data set recorded on the tape. The end location is stored in the memory before the last data are written to the tape. In a further operation mode, data identifying the location of one or plural successfully written data sets which have already been written to the tape are stored in the memory while user data are written to the tape.

16 Claims, 5 Drawing Sheets

DATA STORAGE METHOD, APPARATUS AND MEDIUM

FIELD OF THE INVENTION

The present invention relates to a recording medium cartridge of the type which includes a memory for storing information concerning signals recorded on the recording medium and more particularly, although not exclusively, relates to a method for recording information on the memory so as to improve the efficiency of retrieving information stored on the recording medium.

BACKGROUND OF THE INVENTION

In order to store digital electronic data, it is known to use magnetic tape data cartridges which are inserted into a tape drive unit having a plurality of read/write heads. Typically such magnetic tape storage devices may be used to back up data generated by a host device, eg. a computer.

In order to improve ease of access to data recorded on tape, it is known to include a solid state memory device within the cartridge and to store in this memory information relating to, for example, a listing of the contents of the tape.

In particular, in EP 0,646,914, there is realized an analog data recording video cassette of the type in which data is recorded in a plurality of scans across a width of the tape by a rotating record head, and which includes a memory device which can be configured to store fundamental information concerning the cassette and its contents, such as table of contents information or the like. In EP 0,646,914, the information concerning the cassette and its contents is transferred from a VCR tape drive unit to the video cassette through a set of metallic terminals provided on the cassette which make electrical and physical contact with a corresponding set of metallic terminals on the VCR drive unit.

In EP 0,580,434, there is disclosed a VCR recording medium cartridge, wherein video data is stored in a plurality of diagonal scan passes across a width of the tape, by a rotating write head, and which includes a memory circuit for storing information concerning signals recorded on the recording medium within the cartridge. At least some of the data stored within the memory circuit can include the starting and ending positions of signals recorded on the recording medium and these starting and ending positions are recorded in the memory circuit at substantially the same time as recording to the recording medium. However, in EP 0,580,434 using an EEPROM memory, long write times are encountered, whereas use of a flash memory leads to long accessing times.

In WO 89/10615, there is disclosed a cassette containing a recording medium for use storing computer generated data, which includes a storage device for storing directory information concerning the contents of the tape. The storage device comprises a non-volatile random access memory and associated microprocessor and is accessed by either inductive coupling or electrical contact pads.

In U.S. Pat. No. 4,338,644 there is disclosed a cassette containing a recording medium which also includes within the housing an electronic memory and semiconductor circuits for storing data relating to the cassette or tape therein.

EP 0,640,972 discloses a video tape cassette containing memory device which can be used to store information concerning the contents of the information recorded on the video tape, such as time of recording, position and the like.

In order to facilitate accessing data recorded on tape and to protect against accidentally overwriting essential data when recording new data it is known to record a marker on tape signifying the position of the last valid user data on the tape (EOD). It is also known to record the position of the EOD in a special reserved area of tape whose position is defined by the particular format of that tape. However, it is necessary to read this area of tape when the cartridge is first loaded and to re-record this area with the latest EOD position when the cartridge is unloaded. This repeated winding and rewinding of the tape each time new data is recorded to the tape adds significantly to the time required to back up data from a host device. In addition, wear on the tape caused by repeated winding forwards and backwards results in a decrease in reliability.

As data recording technology develops and the density of data written onto tapes increases it becomes increasingly imperative to improve both data access times and tape reliability.

SUMMARY OF THE INVENTION

The specific embodiments and methods according to the present invention aim to improve the accessing of data written in high data density data tape systems having a plurality of read/write heads. The specific embodiments and methods disclosed herein aim to provide improved protection against loss of data resulting from unplanned power loss to two such devices during data back up.

Specific methods according to the present invention, recognize that if a record of the position of the last recorded data on tape is stored in a memory device, then the current position of the last recorded data on a tape can always be retrieved.

According to a first aspect of the present invention there is provided a data storage device (200) comprising: a casing (200); a data storage medium (100) for storing data; and a memory device (416), wherein said memory device (416) is configured to store data identifying a location of a last stored data written onto said data storage medium (100); and data defining an end of said stored data (114) is recorded on said data storage medium (100), characterised in that said data, identifying a location of said last stored data (114), is stored in said memory device (416) before said data defining end of stored data (114) is recorded on said data storage medium (100).

In the best mode, said data storage medium comprises an elongate tape (100) and said write operation comprises a write pass along a length of said tape.

Said write operation may comprise a write traversal along a length of said tape.

Preferably, said memory device comprises: a memory area (416); a means (410) for writing data into said memory area (416); and a means (410) for reading said data from said memory area (416).

The memory area preferably comprises an area of an electrically erasable programmable read only memory, and the means for writing data into the memory area preferably comprises a processor adapted to receive data from a receiver device, the whole arrangement being powered by an inductive signal being produced by a corresponding transmitter device in a tape drive device to which the data storage device is placed in close physical proximity to during normal read/write operations of data to the data storage medium. The means for reading data from the memory area preferably comprises said processor, configured to read from said memory area. The processor is preferably connected to a transmitter which is capable of transmitting data stored in the memory area away from the data storage device, to a corresponding transceiver mounted in a tape drive device. The memory area, processor, transmitter and receiver, together with a crystal oscillator, and an aerial form a transponder device which is physically mounted on a casing of the data storage device. The transponder is inductively powered by RF signals produced by a corresponding transceiver mounted on the tape drive device, which both powers the transponder, and communicates with the transponder via the RF link.

Preferably said data storage medium comprises a magnetic tape data storage system.

According to a second aspect of the present invention there is provided a data recording apparatus comprising: a means for writing data (110, 120) to a data storage medium (100); a means for reading said data (110, 120) from said data storage medium (100); characterised by comprising: a means for writing data (400) identifying a position of a last user data written onto said data storage medium in a memory device, wherein said data recording apparatus operates to write to said memory device said data identifying a position of a last user data, before terminating a write operation of writing data to said data storage medium.

The data recording apparatus preferably comprises a transceiver as hereinabove described, mounted in a tape drive device. The transceiver comprises a transmitter, a receiver, a crystal oscillator, a processor, a serial interface, and an antenna. The antenna of the data recording apparatus communicates with the antenna of the data storage device, and is arranged to inductively power the data storage device by means of RF signals transmitted by the transmitter.

According to a third aspect of the present invention there is provided a method of writing data to a data storage medium said method comprising the steps: formatting data into data sets; performing a write operation to write said data sets to a plurality of tracks (110, 120) of said data storage medium (100); and writing a last data set to said plurality of tracks, of said data storage medium (100), characterised in that said last data set (114) contains information concerning a location of said last data set on said data storage medium (100); and said information concerning a location of said last data set of said data storage medium (100) is written to a memory device (416) before said information is written to said data storage medium (100).

Preferably, said information concerning a location of said last data set of said data storage medium is selected from the set: tape write pass for last written EOD (601); load count (602); record count at EOD (603); file mark count at EOD (604); EOD data set number (605); wrap section number of EOD (606); validity of EOD (607); first CQ set number (608); physical position of EOD (609); reserved; and a cyclical redundancy code to verify a correct location of an EOD (611).

According to a third aspect of the present invention there is provided a method of operating a tape data storage device, comprising a tape data storage medium and an associated quick access memory unit having an average access time of less then an average access time of said tape data storage medium, said method comprising the steps of: storing in said quick access memory unit (416) location data describing a location of a most recently written end of data recorded on said tape data storage medium, said location data identifying a physical position of said most recent end of data (114) in relation to said tape, wherein said location data is stored in said quick access memory unit before terminating a write operation writing said recorded data to said tape data storage medium.

Preferably said location data comprises data identifying a longitudinal position along a length of said tape, and a position across a width of said tape.

Preferably said location data is first stored in said quick access memory unit, and is subsequently stored on said tape.

According to a fourth aspect of the present invention there is provided a method of writing data to a data storage medium said method characterised by comprising the steps of: formatting said data into a plurality of data sets; performing a write operation to write at least one data set of said plurality of data sets to at least one track of said data storage medium (100); reading at least one said data set from said data storage medium (100); verifying that said read data set has been successfully written to said data storage medium; and storing data in a memory device (416), said data identifying a location on said data storage medium of said successfully written data set.

Preferably said data identifying a physical location on said data storage medium of said successfully written data set is selected from the set: tape write pass for said successfully written data set; load count (602); record count at said successfully written data set; file mark count at said successfully written data set; said successfully written data set number (605); wrap section number of said successfully written data set; validity of said successfully written data set; first CQ set number (608); physical position of said successfully written data set; and a cyclical redundancy code to verify a correct location of said successfully written data set.

Preferably said steps of reading at least one data set; verifying that said read data set has been successfully written; and storing in a memory device said data identifying a location of said successfully written data set, are periodically repeated during a data write operation comprising writing a plurality of said data sets to said data storage medium.

Preferably said data identifying a location of a successfully written data set is stored in said memory device at least once for every write traversal of said data storage medium.

Preferably said data identifying a location of said successfully written data set comprises data describing a logical position of said successfully written data set.

Preferably said data storage medium comprises an elongate tape, and said data identifying a location on said data storage medium comprises data identifying a longitudinal position along a length of said tape, and a position across a width of said tape.

In the best mode, the memory device is physically associated with the data storage medium. Suitably, the memory device comprises an electrically erasable programmable read only memory.

According to a fifth aspect of the present invention there is provided a data storage device (200) comprising: a data storage medium (100) for storing data; and a memory device (416), characterised in that: said memory device (416) is configured to store data identifying a location of a last successfully written set of data stored on said data storage medium (100).

According to a sixth aspect of the present invention there is provided a data recording apparatus comprising: means for writing data (110, 120) to a data storage medium (100); means for reading said data (110, 120) from said data storage medium (100); characterised by comprising: means for writing data identifying a position of a last user data written onto said data storage medium, said means for writing data adapted for writing said data to a memory device associated with said data storage medium, wherein said means for writing said position identifying data operates to write data identifying a location on said data storage medium of a successfully written data set.

Preferably said data recording apparatus further operates to read from said data storage medium a most recently read data set written to said data storage medium; and verify that said most recently read data set is successfully written.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific methods according to the present invention described herein are concerned with magnetic tape recording devices having a substantially static read/write head in which an elongate tape is drawn past the head at relatively high speed, for example of the order 3 meters per second. However, the general methods disclosed and as identified in the claims herein, are not limited to static head devices, or devices having high tape speed.

Reading and writing of data onto the tape may be carried out in both forward and reverse pass directions of the tape relative to the head, and a plurality of parallel data tracks may be read or recorded onto the tape simultaneously in a direction along the length of the tape using a read/write head comprising a plurality of spaced apart read/write elements.

In particular, specific methods according to the present invention described herein relate to recording devices and tape data storage media where the tape is permanently stored within a cartridge which is removable from a tape drive mechanism.

Figure 1:
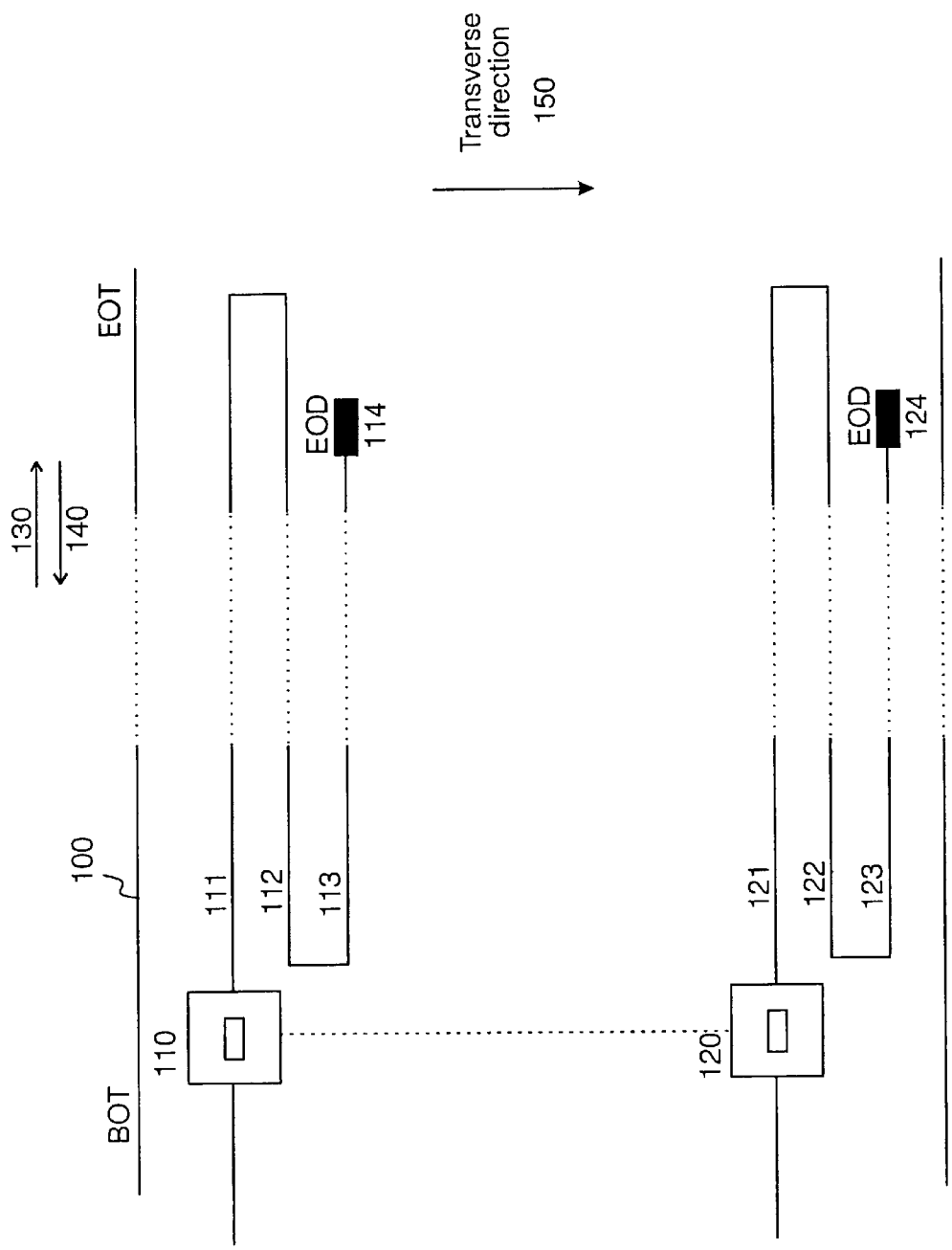
FIG. 1 illustrates schematically a plurality of paths taken by a plurality of read/write elements relative to an elongate band of magnetic tape material according to a specific method of the present invention.

Referring to FIG. 1 herein, there is illustrated schematically a physical layout of data recorded, along an elongate band 100 of magnetic tape by a plurality of read/write elements 110–120 of a magnetic data recording device as the tape is drawn past the head. In the best mode herein, there are 4 parallel bands recorded on the tape. Each band is sandwiched between 2 servo bands which are recorded to the tape before the tape is used to record data. Encoded within the servo bands are longitudinal position (LPOS) words which record the absolute location down the length of the tape and manufacturers data. The plurality of read elements and plurality of write elements are arranged to read or write a plurality of physical tracks of data along the tape simultaneously, resulting in physical tracks 111–113, 121–123 which are recorded parallel to each other along the length of the tape. The plurality of read/write elements are spaced apart from each other in a direction transverse to the direction of the tape, typically by distance of the order 200 μm. Each read/write element is capable of reading or writing a physical track of width of the order 20 μm or so.

Each of the plurality of read/write elements 110–120 are configured such that, during a write operation to write data to a physical track on tape the data written to tape are, at substantially the same moment, read back from tape by the plurality read/write elements 110–120. The data read back from the tape are examined to ensure that the write operation was successful.

A smallest data unit written to or recovered from tape is termed a Data Set. There are four types of data sets:

Format Identification Data Set (FID), ie data which identifies a recording format used;

user data, ie data to be stored for example from a host device, eg a computer, end of data (EOD), ie a data set marking a termination point on the tape of a series of user data sets comprising a file or record of user data; and vendor specific data, i.e. data which are specifically written by a vendor of the tape cartridge and/or a tape drive mechanism.

A data set includes two parts. The first part comprises a data region of 403884 bytes. The content of the data region is dependent on the type of data set being recorded. The second part includes a data set information table (DSIT) having 468 bytes. The information in the DSIT describes the contents of the data region. For all types of data sets, data to be stored are placed in the data region and the DSIT is appended to form a 404352 byte data set. Data sets within a user data area are identified by their ordinal numbers. The first data set recorded on tape within the user data area (the FID) is set at data set number 0. The data set number is incremented by 1 for each subsequent data set recorded on tape. User data are arranged into a plurality of codewords which also include redundancy encryption data, eg. cyclical redundancy coding data. Four codewords comprise a Codeword Quad of 960 bytes. Each data set comprises 512 Codeword Quads of 960 bytes each. A group of Codeword Quads that is written simultaneously to a plurality of tracks is known as a CQ set.

Ideally the tape winds its full length from a first end (beginning of tape, BOT) to a second end of the tape (EOT) during a "pass" of the tape past the read/write elements. In this specification a "write pass" is defined as a single passage of the tape past a write head for writing onto one or more tracks, irrespective of whether the tape speed varies, or whether the tape stops during a pass. An end to end write pass which traverses a whole length of the tape is termed herein a "write traversal." During a back up operation, the tape traverses the read/write elements in a forward direction 130 and in a reverse direction 140 a number of different times, during a plurality of different write passes. A write pass comprises a sequence of writes which cause data to be written sequentially along one or more tracks, which are themselves written in sequence. Tracks extend along the length of the tape and their read/write direction is along their lengths and is substantially parallel to a main length of the tape. In a normal sequential recording operation after recording one write pass along the tape between the beginning of the tape (BOT) to the end of the tape (EOT), the plurality of read/write elements are moved by a distance of the order 20 $\mu$m in a transverse direction 150, with respect to the elongate direction of the tape. Data are then written to the tape with the tape moving in the opposite direction to the previous write pass. The plurality of read/write elements trace a "serpentine" path on the tape as shown in FIG. 1 herein. After each successive write pass the plurality of read/write elements are moved a further short distance of the order 20 $\mu$m in a transverse direction to the main length of the tape. The plurality of parallel tracks recorded on the tape simultaneously by the plurality of read/write elements (i.e. transducers) during a single pass of the tape from the beginning of the tape (BOT) to the end of the tape (EOT) in a single forward direction or a reverse direction is known herein as a "wrap".

According to a first embodiment of the present invention, the logical end of user data recorded onto tape is indicated by an End of Data Data Set (EOD data set) 114–124 is simultaneously recorded on each of the plurality of tracks during a single write pass. The presence of this EOD Data Set physically recorded on a plurality of tracks facilitates rapid searching of the tracks to identify the end of user data recorded on the tape in preparation for making a subsequent back up of data. However, if the tape has been reused to make several previous back ups of user data, more than one EOD Data Set may be recorded on tape. According to the preferred embodiment, data stored after an EOD Data Set are considered logically invalid. Hence, in order to find a true logical end of data recorded on a tape it is necessary to identify the EOD Data Set which has been most recently recorded to the tape. During a back up, when a host computer stops writing data, the drive cannot "know" whether the host has stopped writing permanently or just for a moment. Thus, a drive waits for a period of time between receiving the last data from the host device and writing an EOD Data Set to the tape. If, during this pause, the tape drive is switched off, then the EOD Data Set is not written to tape rendering the true logical end of data on tape inaccessible. To protect against this loss of data, it is subject of the specific implementations of the present invention described herein to store information concerning the location of the most recent EOD Data Set in a memory device contained within the data storage cartridge.

Figure 2:
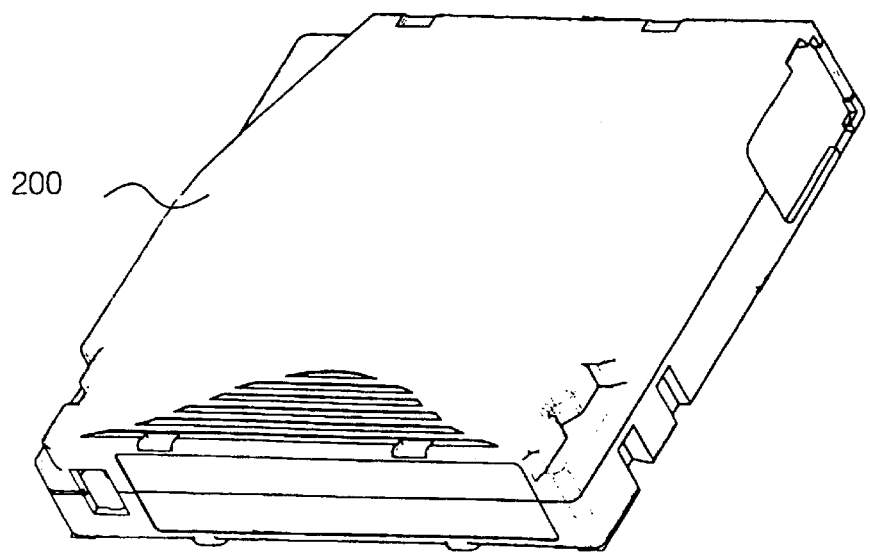
FIG. 2 illustrates a tape data cartridge according to a first specific embodiment of the present invention.

Referring to FIG. 2 herein, there is illustrated a tape data storage cartridge 200 preferably used with the present invention, comprising a case; automation notches; handling notches; a write-inhibit mechanism; a single reel for storing magnetic tape; a locking mechanism for the reel; a magnetic tape wind on the hub of the reel; a leader pin; a parking mechanism for the leader pin; a door; and a memory device located within the casing. In the first specific embodiment, before the tape cartridge is inserted into a tape drive, the tape is wound fully onto the reel inside the cartridge. To access data on an end of the tape nearest the reel, the tape must be substantially fully wound out of the cartridge and onto a second reel of the tape drive mechanism. Before the cartridge is removed from the tape drive, the tape must be fully rewound back onto the reel inside the cartridge. Therefore, every time the cartridge is inserted into a tape drive mechanism, there is a delay incurred in reaching the end of data on the tape, and the time taken to wind the tape to the end of data depends at least in part on the position of the end of data along the length of the tape.

Figure 3:
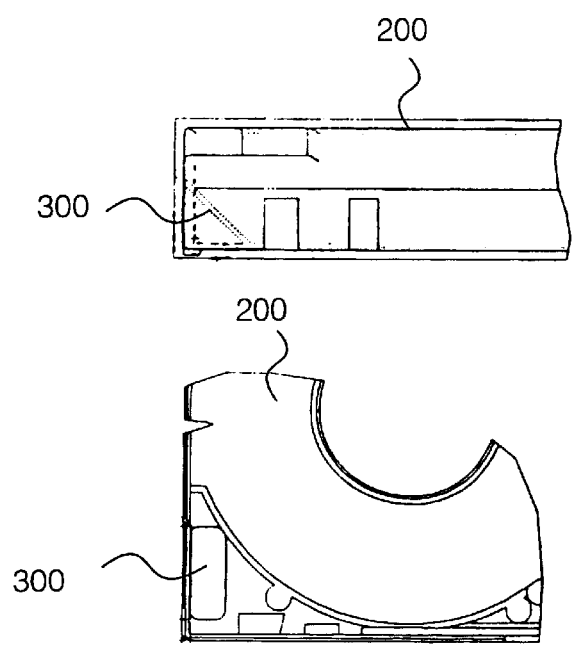
FIG. 3 illustrates two views of the tape data cartridge indicating the position of a memory in cartridge according to the first specific embodiment of the present invention.

Referring to FIG. 3 herein, there are illustrated two views of a section of tape data cartridge 200 indicating the approximate position and orientation of the memory device 300 in the case. The memory device 300 is positioned near a periphery of the casing and within the casing such that as the cartridge is inserted into the tape drive unit, signals can be read and written to the memory device 300 by inductive coupling.

Figure 4:
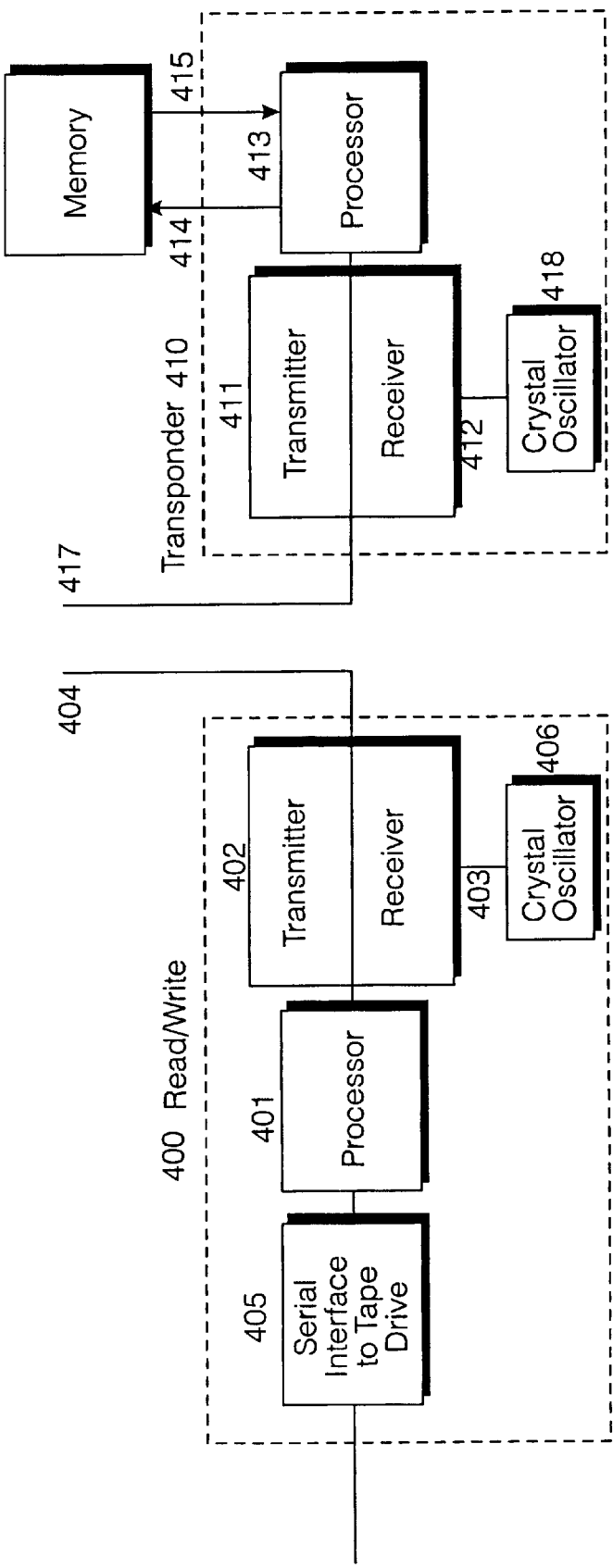
FIG. 4 illustrates schematically a device for writing data to a memory cartridge according to a specific method of the present invention.

Referring to FIG. 4 herein, there is illustrated schematically a reader/writer device 400 for reading data from and writing data to the memory device 300. A transmitter/receiver module 400 is incorporated into a tape drive mechanism such that when a tape cartridge is inserted into the tape drive mechanism, a transponder memory device 410 incorporated within the data cartridge can be inductively powered, and data signals can be received and sent between the transmitter receiver 400 on the tape drive and the transponder in the tape cartridge. The tape drive transmitter/receiver 400 comprises: a serial interface to the tape drive 405; a processor 401; a transmitter 402; a receiver 403; a first antenna 404; and a crystal oscillator 406. The memory device 300 comprises a memory area 416 which is preferably an electrically erasable programmable read only memory (EEPROM) and a transponder 410 including a transmitter 411; a receiver 412; an antenna 417; a processor 413 and a crystal oscillator 418. The reader/writer device 400 and the transponder 410 exchange information using a contactless interface via antennas 404 and 417. This contactless interface uses inductive coupling employing a magnetic field to transmit data to/from the transponder 410, and supply power to the transponder 410 and memory area 416. A protocol used to transmit information via inductive coupling is the known MIFARE® system developed by Philips/Mikron as is currently employed in "smart" credit card technology used in personal banking applications. Some advantages and features of this system include high reliability, an operating frequency of 13.56 MHz, and the ability to handle several data storage cartridges within an operating field of a single data storage device.

According to a preferred embodiment, the separation of antennas 404 and 417 on the tape drive and on the cartridge, when the cartridge is installed in the tape drive, is of the order $\leq 20$ $\mu$m. Over such a range this yields coupling factors of the order 1 to 10% and transmission speeds of the order 100 kilobits per second (Kbps) between antennas 404 and 417.

According to a preferred embodiment, the reader/writer device 400 and the transponder 410 and memory 416 are both implemented as application specific integrated circuits (ASIC). The memory area 416 is an electrically erasable programmable read only memory (EEPROM) having a total capacity of 4 kilobytes organized as 128 blocks of 32 bytes each. Access to the blocks is controlled using write protection. Write protection means that the access condition to the specified block is switched from read and write to read only.

A preferred memory 416 in the cartridge is designed to be read an unlimited number of times and to be able to undergo up to 500,000 write cycles.

Figure 5:
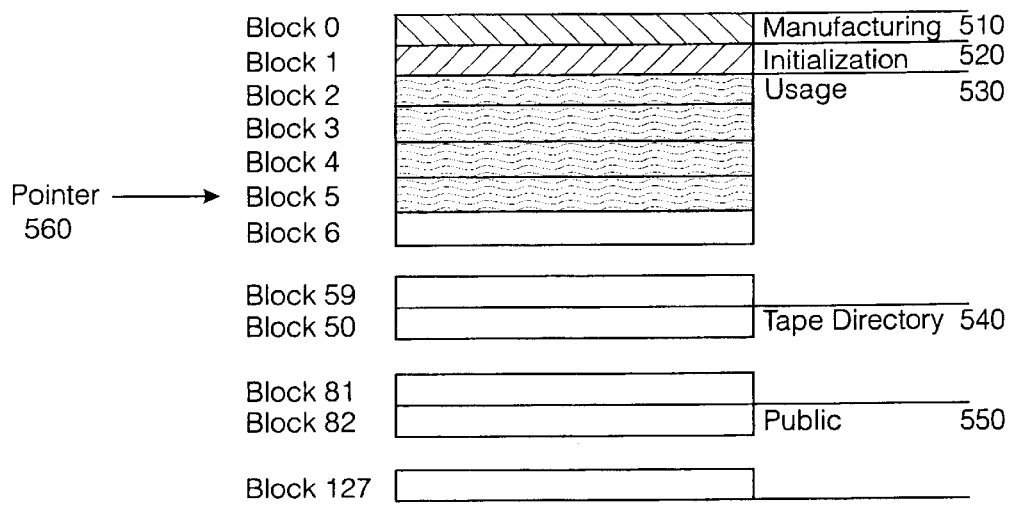
FIG. 5 illustrates schematically a layout of data within a memory in cartridge according to the specific method of the present invention.

Referring to FIG. 5 herein, there is illustrated a logical arrangement of data within memory device 416. Three different types of write protection are employed as follows:

Firstly, write protection in test flow: a manufacturing block 510 is protected with 3 bits in block 0, and can only be read after test.

Secondly, write protection with one bit: an initialization block 520 is write protected with one bit which is stored in the initialization block and can only be irreversibly set once.

Thirdly, write protection by means of a pointer 560: blocks of memory allocated to usage 530, tape directory 540 and public 550 are divided between one write protected region and one non-write protected region. The border between these regions is indicated by a pointer which stores the address of the last protected block. The pointer itself is stored in the initialization block 520. The pointer is irreversibly set when the initialization block is write protected.

Figure 6:
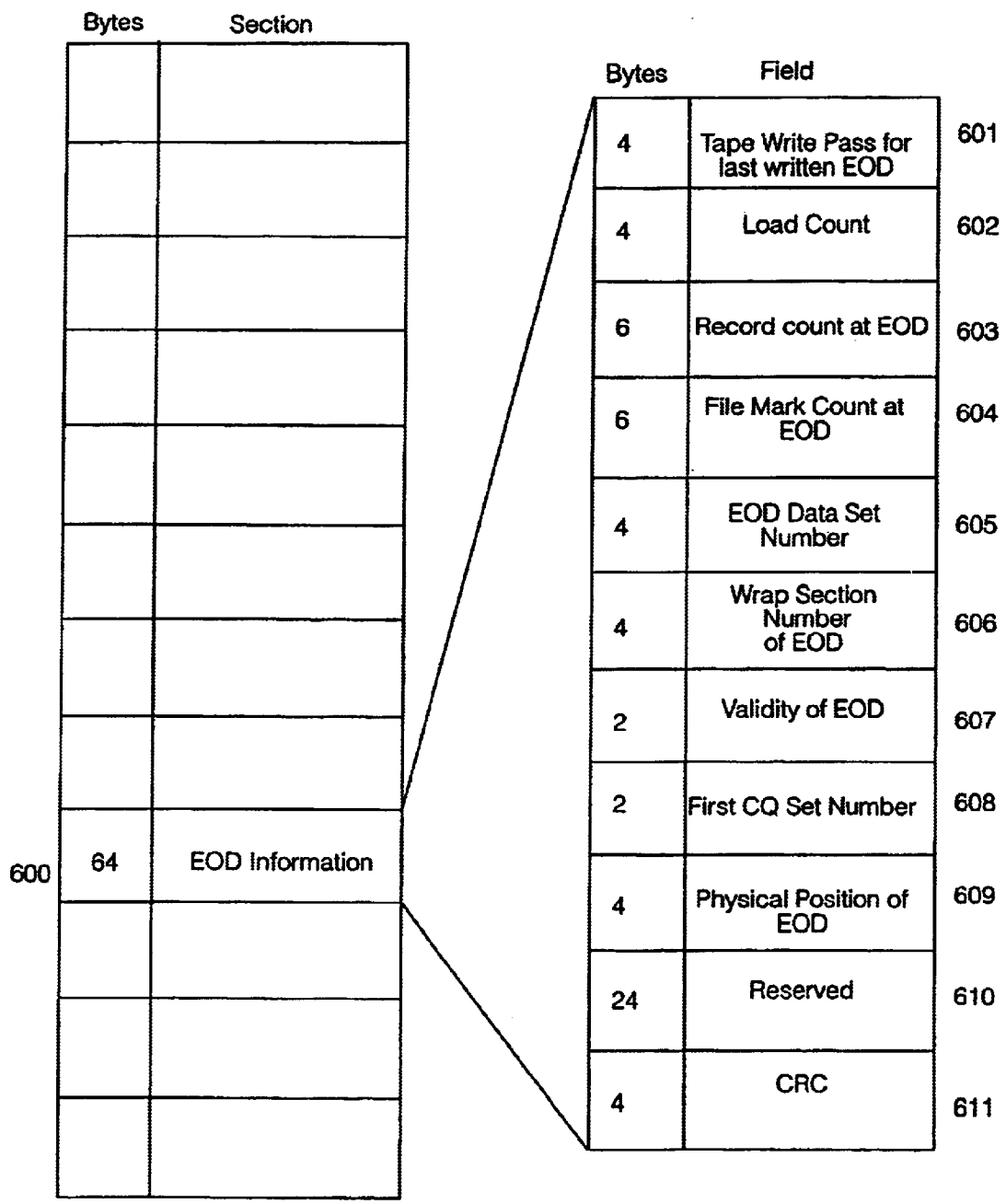
FIG. 6 illustrates schematically an overview of the data stored in the memory in cartridge according to the specific method of the present invention.

FIG. 6 is a schematic illustration of how the blocks within the EEPROM 416 are allocated to specific sections indicating the content of the information stored therein and the amount of memory in bytes allocated to each section. In particular, there is included a section "EOD information" 600 having the following data fields:

The tape write pass for the last written EOD. This indicates the current value of the tape write pass which is incremented each time that a data set is rewritten, or overwritten;

Load count 602. This describes the number of complete cartridge loads (threaded and accessed) when the EOD data set was written;

Record count at EOD. This is the number of records contained on the tape between BOT and EOD;

File mark count at EOD. This is the number of file marks that are contained on the tape between BOT and EOD;

EOD data set number. The data set number of the EOD data set;

Wrap section number of EOD (606). The identification of the section containing the EOD. The wrap section number of the EOD data provides information on where, laterally across the width of the tape, the head is to be positioned in order to align with the correct track(s) containing the last written EOD;

Validity of EOD. Indicates the current status of the information held about EOD. Legal values are:
00: unknown
01: current
02: back up in progress
"Validity of EOD" is set to "back up in progress" when writing starts. The information in the rest of the table reflects the position of the last known transition between wrap sections. This enables the real position of the EOD to be found with the minimum of searching if, for some reason, the real EOD position is not stored when EOD is written, or if power is lost during the back up. The writing drive updates this field each time that it performs an append at any place other than the current EOD location.

First CQ set number. This is the absolute CQ set number of the first CQ set in the EOD data set;

Physical position of the EOD. The LPOS value information of which the EOD was written. This is the value for an LPOS mark that lies within the data set separator preceding the EOD data set; and CRC. A cyclic redundancy code provides for error checking of the EOD information. The CRC provides means to verify a correct read of EOD from the memory 416. CRC is an example of an error detection scheme, possibly with correction power, to guarantee the integrity of data. In particular, the "validity of EOD" field is not necessarily valid without confirmation from the CRC or whatever other scheme is used.

By a combination of the physical position of the EOD (the longitudinal position information) and the wrap section number of EOD 606 (the lateral position of the end of data) the physical position of the End of Data data along the length of elongate tape can be ascertained. By reading the data describing the physical longitudinal and lateral position of the End of Data (i.e. by knowing which set of tracks transversely across the tape where the EOD resides and its position longitudinally along the tape), the tape drive unit can be driven to wind the reels of the cartridge the appropriate amount, and to move the read/write head across the width of the tape to the appropriate position in order to start writing new data at the appropriate position on the tape after the last, i.e., most recently written, end of data.

During a back up of user data from a host device, the end of data information stored in the memory area 416 in the cartridge 200 is updated whenever the data flow from the host device stops, and after a delay the end of data information is also written to an EOD data set at the current logical end of user data on the tape. According to a preferred arrangement, the memory area 416 in the cartridge 200 is designed to retain data for at least 20 years, without the need to externally induce current to the transponder 410.

Figure 7:
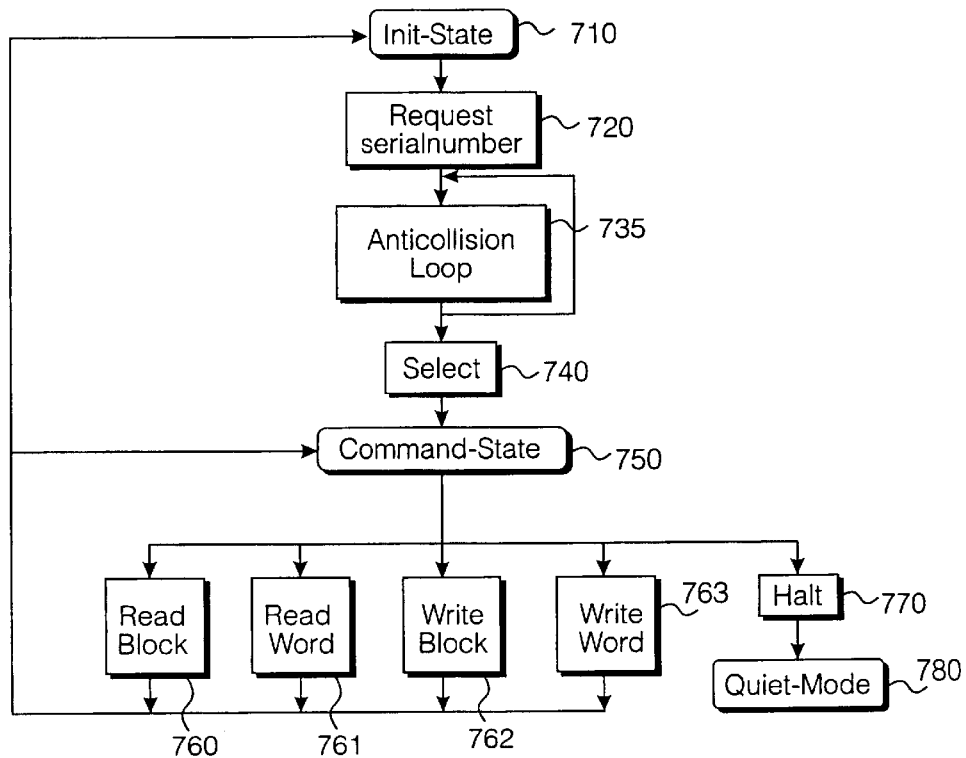
FIG. 7 illustrates schematically a command sequence for writing data to the memory in cartridge and reading data from the memory in cartridge according to the specific method of the present invention.

FIG. 7 is a schematic illustration of command sequences performed by processor 413 to write data to memory 416. After an RF field is derived from the antenna 404 in the tape recording device and received by the antenna 417 in the cartridge, all transponders and cartridges within the operating range of the read/writer 400 are placed in "Init-State" 710. Upon receiving the "request serial number" command 720, all transponders within the operating range return a 10 byte alpha-numeric serial number which is unique to each cartridge. In the anti-collision loop 735, the serial number of the transponders are read. If there are several transponders in the operating range of a reader/writer 400 they can be distinguished by their different serial numbers and one can be selected for further transactions using the select command 740. The un-selected transponders return to the Init-State 710 and wait for a new request serial number command 720 and anti-collision loop 735. The selected transponder is placed in a "command state" 750. In the command state, the transponder can accept the following commands:
read block 760;
read word 761;
write block 762;
write word 763;
halt 770; and
enter a quiet mode 780.

If the transponder has correctly received and performed a command a four bit acknowledgment command signal (ACK) is transmitted by the transponder 410 to the reader/writer 400 and the transponder returns to command state 750. However, if a command is not correctly received a 4 bit not acknowledged (NACK) signal is sent by the transponder 410, and the transponder returns to Init-state 710.

In a second embodiment in which a tape data cartridge comprises a pair of reels, the cartridge can be ejected from a tape drive unit without rewinding. If a tape is then reloaded, the drive needs to determine the position of the tape relative to its length at the time the cartridge is reloaded. In the prior art, twin reel cartridges are rewound to the beginning of the tape, before unloading. If not, on reloading the cartridge to the tape drive, the tape is rewound to the beginning. The beginning of the tape can be established optically.

In the present second embodiment, the memory device stores the last physical position of the stored data describing the last physical position, which is the same as the EOD location after a backup, and comprises similar information after a read. This enables a physical rewind to be wholly or partially eliminated thereby reducing the load/unload access times, tape drive wear, and tape wear.

In a third embodiment, the memory device (416) stores the physical location of a data set successfully recorded to a plurality of tracks on a data storage medium during a back up operation. According to the preferred embodiment previously described herein, an EOD data set is written at a current logical end of data point on a tape, and, when there is a halt in the flow of data from the host device, a physical location of the EOD data set is also stored in the memory device (416). This halt in the flow of data is also known as a "stream fail". An EOD data set is only written to tape when a stream fail occurs. However, an EOD data set is not written to tape every time a stream fail occurs. Preferably, an EOD data set is written to tape when there is a halt in the flow of data from the host device which is followed by a command that would cause the tape to move from its current position with respect to the plurality of read/write heads. Usually, the commands which trigger writing an EOD data set to the tape are a Rewind or a Space operation.

However, the situation may arise where there is no halt in the flow of data from the host device during a back up which could result in a significant fraction of the total capacity of the magnetic tape being used without an EOD data set being written to the tape. If, in that situation, a failure should occur, eg. an interruption to the power supply to the data storage device, the tape is rewound to its beginning and the tape is read sequentially through all of the data in order to identify a true location on the tape of the last data set written to tape. These operations are performed because there is no current EOD data set recorded on tape or stored in the memory device. These operations enable the position of the last data set written to tape to be located. Rewinding to the beginning of the tape and reading all of the data written to tape could significantly increase the time required to perform back ups of user data and cause increased wear to both the magnetic tape and the data storage device, in turn resulting in a decrease in reliability.

According to the third embodiment of the present invention, the location of a successfully written data set is stored in the EOD information fields (601–611) of the memory device 416 while a back up is proceeding. Regularly updating the location information in the memory device of a data set successfully written to tape during a back up enables the tape device to detect the location of the last data set written to tape should a fault occur, eg. a loss of power supply to the data storage device, during a back up. If, after a failure during a write operation, the tape is positioned at a location corresponding to the position of a data set stored within the EOD information fields sequentially read to find the last recorded data on tape, the data from the current tape position to the end of the written data are sequentially read. This results in a significant decrease in the time required to locate the last data written on the tape. Preferably, the physical location information of a successfully written data set is refreshed at least once on every write pass which is a traversal of a tape from the beginning of the tape to the end of the tape in a forward direction or from the end of the tape to the beginning of the tape in a reverse direction. The number of times the position information of a successfully written data set is refreshed is constrained by the limited number of write cycles the memory device can undergo.

The physical position information stored during each time for a given data set is the same information as is stored for an EOD data set. Among the position information stored are (1) physical position of the successfully written data set and (2) the "logical position" which represents the position of the successfully written data set in terms of records (603) and file marks (604) from the beginning of the tape.

What is claimed is:

1. A method of writing data to a data storage medium comprising:

formatting said data into a plurality of data sets;

writing at least one data set of said plurality of data sets to at least one track of said data storage medium;

reading at least one said data set from said data storage medium;

verifying that said read data set has been successfully written to said data storage medium; and storing data in an independent memory device that is separate from the data storage medium, the stored data identifying a location on said data storage medium of said successfully written data set;

wherein said data storage medium comprises an elongated tape, and said data identifying the location on said data storage medium comprises data identifying the longitudinal position along the length of said tape, and the position across the width of said tape.

2. A data storage device comprising:

a casing;

a data storage medium in the casing for storing data including data indicating the end of a data set stored in the medium;

a memory device for storing data identifying the location of last stored data written onto said data storage medium; and a processor arrangement for writing into said memory device said data identifying the location of said last stored data before said data defining end of stored data are recorded on said data storage medium.

3. A data storage device as claimed in claim 2, wherein said data storage medium comprises a magnetic tape data storage system.

4. A data storage device as claimed in claim 2, wherein said memory device comprises an electrically erasable programmable read only memory.

5. The data storage device of claim 2, wherein said data storage medium comprises an elongate tape, and the processor arrangement is arranged for writing a write pass in a direction along a length of said tape.

6. A data storage device of claim 2, wherein said data storage medium comprises an elongate tape and the processor arrangement is arranged for writing a write traversal along an entire length of said tape in a direction along the length of said tape.

7. A data storage device of claim 2, wherein said memory device comprises:

a memory area; and the processor arrangement being arranged for writing data into and reading data from said memory area.

8. The data storage device of claim 2 wherein the memory device is in the casing.

9. The data storage device of claim 2, further including a wireless link between the casing and another structure including a mechanical drive for the data storage medium, the wireless link being arranged for coupling the data to be stored in and read from the medium between the casing and structure.

10. A data recording apparatus comprising:

a transducer arrangement for writing data to and reading data from a data storage medium;

a processor arrangement for writing into a memory device data identifying the position of the last user data written onto said data storage medium;

the processor arrangement being arranged to write to said memory device said data identifying the position of the last user data, before termination of a data write operation to said data storage medium.

11. A method of writing data to a data storage medium comprising:

formatting the data to be written into data sets;

writing said data sets to a plurality of tracks of said data storage medium;

writing a last data set to said plurality of tracks of said data storage medium so that said last data set contains information concerning the location of said last data set on said data storage medium; and writing said information concerning the location of said last data set of said data storage medium to a memory device before said information is written to said data storage medium.

12. A method as claimed in claim 11, wherein said information concerning the location of said last data set of said data storage medium is selected from the set of:

a tape write pass for last written EOD;

a load count;

a record count at EOD;

a file mark count at EOD;

an EOD data set number;

a wrap section number of EOD;

validity of EOD;

first CQ set number;

physical position of EOD;

reserved; and a cyclical redundancy code to verify a correct location of an EOD.

13. The method as claimed in claim 11, wherein said data storage medium comprises a magnetic data storage medium.

14. A method of operating a tape data storage device, including a tape data storage medium and an associated quick access memory unit having an average access time less than an average access time of said tape data storage medium, said method comprising:

storing in said quick access memory unit location data describing the location of the most recently written end of data recorded on said tape data storage medium, said location data identifying the physical position of said most recent end of data in relation to said tape and being stored in said quick access memory unit before terminating writing of said recorded data to said tape data storage medium.

15. The method as claimed in claim 14, wherein said location data includes data identifying (a) a longitudinal position along the length of said tape, and (b) a position across the width of said tape.

16. The method as claimed in claim 14, wherein said location data are stored in said quick access memory unit, and are subsequently stored on said tape.

\* \* \* \* \*